April 5, 1955 J. M. VAN DYK 2,705,366
STATIONARY BRIDGEWORK
Filed Feb. 2, 1951 2 Sheets-Sheet 2

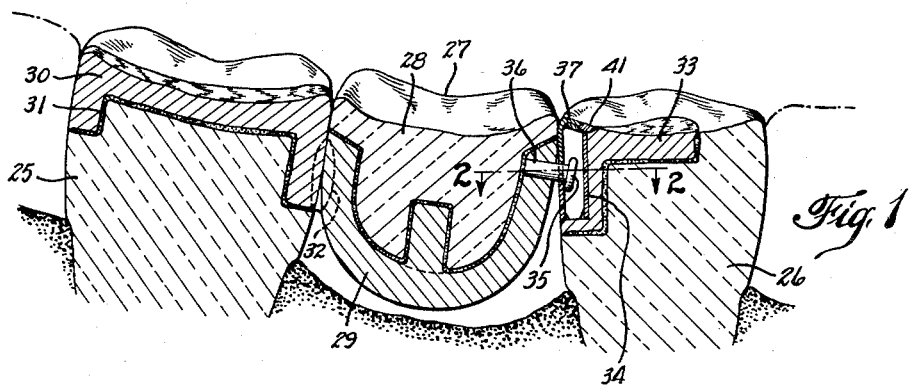
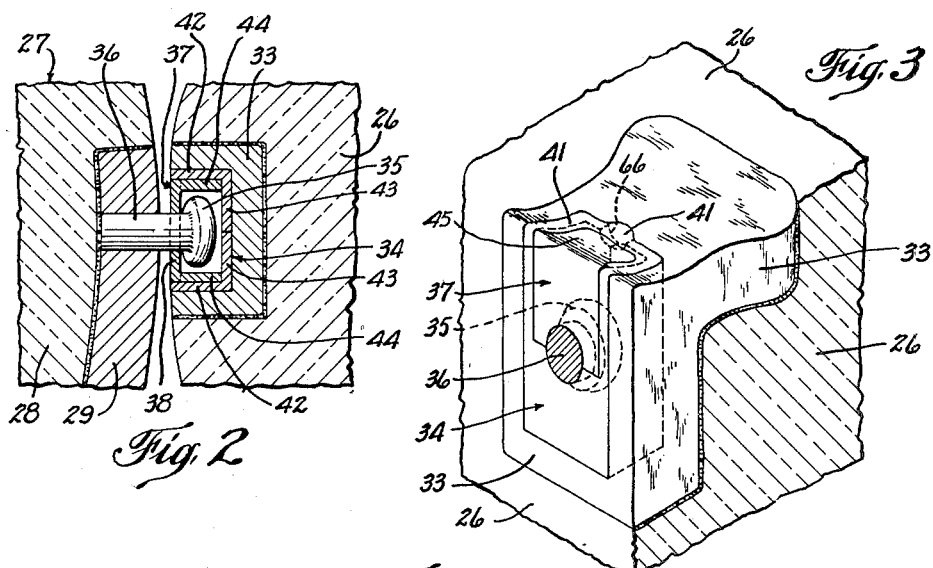
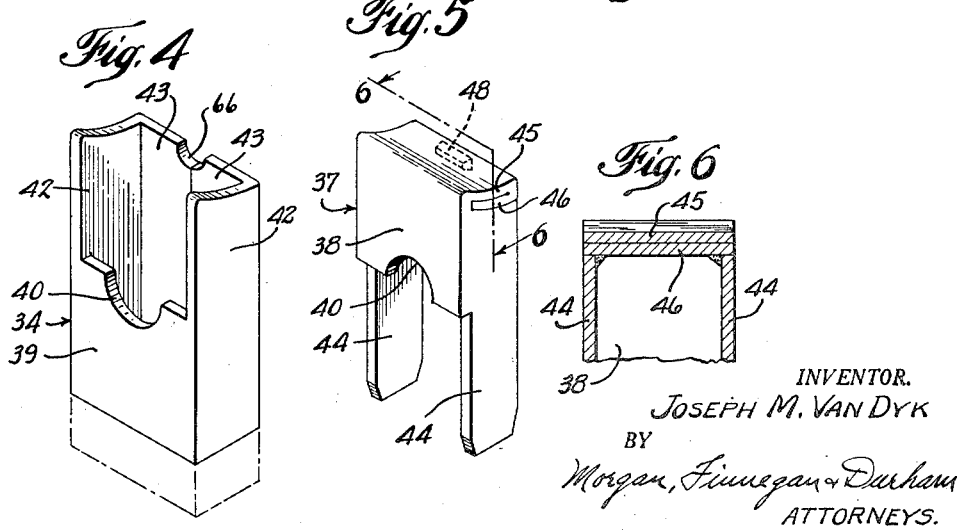

INVENTOR.
JOSEPH M. VAN DYK
BY
Morgan, Finnegan & Durham
ATTORNEYS.

United States Patent Office 2,705,366
Patented Apr. 5, 1955

2,705,366

STATIONARY BRIDGEWORK

Joseph M. Van Dyk, Scarsdale, N. Y.

Application February 2, 1951, Serial No. 209,091

4 Claims. (Cl. 32—6)

The present invention relates to an improved stationary type of dental bridgework.

Objects and advantages of the invention will be set forth in part hereinafter and in part will be obvious herefrom, or may be learned by practice with the invention, the same being realized and attained by means of the instrumentalities, processes, steps and combinations pointed out in the appended claims.

The invention consists in the novel parts, constructions, arrangements, combinations and improvements herein shown and described.

The accompanying drawings, referred to herein and constituting a part hereof, illustrate a part embodiments of the invention, and together with the description, serve to explain the principles of the invention.

The invention provides an improved dental bridgework of the type that is permanently affixed to adjoining or anchor natural teeth of the patient. Although the invention is herein shown and described as providing a single dummy tooth or pontic filling a space between two natural teeth, it will be understood that more than one space may be filled in accordance with the invention. In the provision of such bridgework as is herein concerned, although it is desired to have the dummy tooth or teeth securely and permanently affixed to anchor teeth, it is at the same time desirable to avoid completely rigid connection, as a certain amount of movement normally takes place by the teeth in performing their function, and rigid connections tend to cause the loosening of inlays to which they are anchored. It is therefore desirable to provide at least one connection between a dummy tooth and the adjoining natural tooth which allows limited movement, and it is further desirable to have the movement restricted in every direction, so that the bridgework is not displaced regardless of the direction of force which is brought to bear upon it.

The bridgework of the invention includes a dummy tooth which is fixedly held with respect to one anchor tooth, as by soldering to an inlay thereon, and is held with respect to the other anchor tooth by a connection allowing limited movement. The said movable connection comprises a pivot pin secured to the dummy tooth and extending toward the adjoining anchor tooth, the said pin having an enlarged head received within a cavity provided in the adjacent tooth. Means are provided in connection with the anchor tooth for closely surrounding the shank of the pivot pin restricting movement radially of its axis, and also preventing the enlarged head from being withdrawn from the cavity. As embodied, such means comprise a preferably metallic plate portion or half-door element seated in an inlay for the anchor tooth and having a cooperating plate element or half-door element which may be slid into position and secured with respect to the inlay and other door element as the last step in fabrication of the bridgework, the two half-door elements being formed to closely surround the shank of the pivot pin but still allow for limited movement thereof.

The invention provides a fixed or permanent type dental bridgework which is entirely satisfactory from the point of view of the considerations discussed above, and further advantages are ease in fabrication and installation of the work. The bridgework of the invention allows sufficient movement in the bridge connection, and it may be installed even when the anchor teeth are very substantially out of parallelism without deep cutting into the anchor teeth for the placement of inlays, which frequently endangers the pulp of the teeth. The bridgework is quite useful as preventing the drifting of the anchor teeth in the mouth, and it further provides relatively simple and inexpensive manufactured devices which the dentist or his technician may use in the fabrication of the bridgework. The bridgework of the invention is particularly useful when more than one dummy tooth is to be used in the bridge, and prior constructions for bridges have been particularly unsatisfactory in this regard and have customarily been completely rigid with no movable connection.

It will be understood that the foregoing general description and the following detailed description as well are exemplary and explanatory of the invention but are not restrictive thereof.

Of the drawings:

Fig. 1 is an enlarged posterior-anterior vertical section through two natural teeth and the fixed bridgework of the invention permanently secured thereto as it appears in a patient's mouth;

Fig. 2 is a plan section taken on line 2—2 of Fig. 1;

Fig. 3 is a fragmentary view in perspective of the lateral and cusp surfaces of a metal inlay as cemented in an anchor tooth, which acts as the pivotal anchor of the bridgework;

Fig. 4 is a perspective of a plate portion formed as part of a metal box or anchor pin receptacle adapted to be cast in the inlay for the pivotal anchor tooth;

Fig. 5 is a perspective of the sliding half-door element comprising the separate plate element which is adapted to be inserted in the metal box and cooperate therewith to retain the head of the pivot pin carried by the pontic of the bridge;

Fig. 6 is a section taken on line 6—6 of Fig. 5, and showing how the double thickness top flap is supported by and soldered to the top edges of the door sides;

Figure 7:
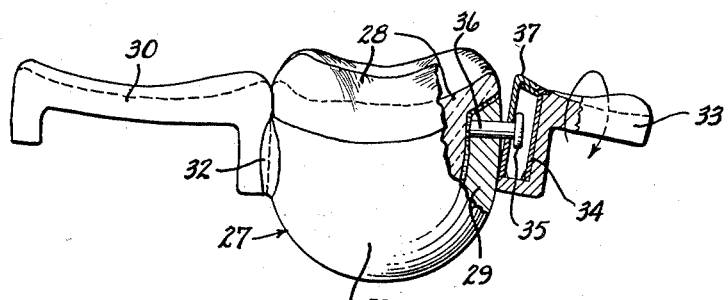
Fig. 7 is a side elevation partly broken away of the completed bridge element just prior to cementing in place in the patient's mouth.
Figure 9:
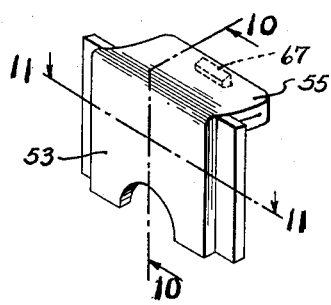
Fig. 9 is a perspective view of the cooperating separate plate element adapted to be slid into place in the element shown in Fig. 8.
Figure 8:
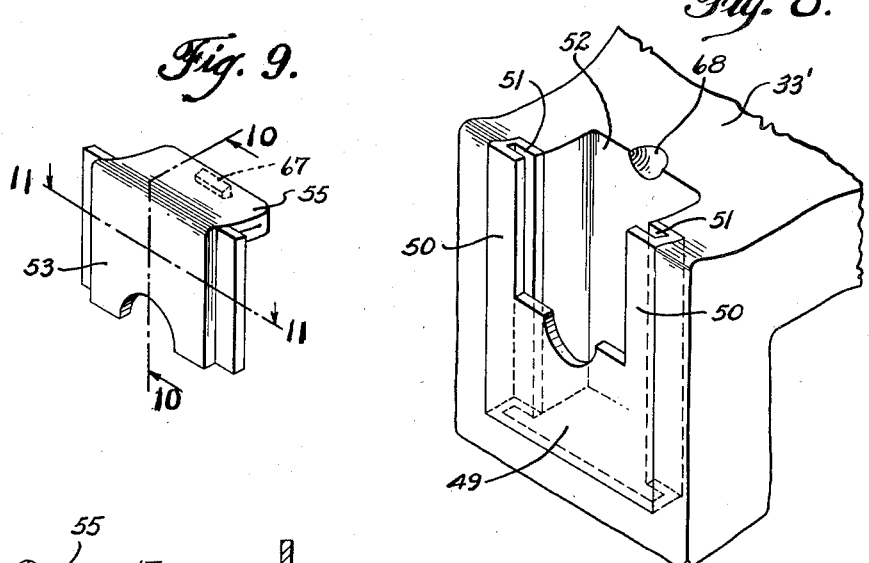
Fig. 8 is a fragmentary perspective view of a modified plate portion cast in the pivot anchor tooth inlay.
Figures 10, 11:
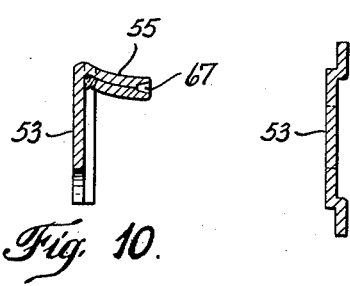
Fig. 10 is a cross-sectional view taken along line 10—10 of Fig. 9.
Fig. 11 is a cross-sectional view taken along line 11—11 of Fig. 9.

Referring now in detail to the illustrative embodiments of the invention shown by way of example in the accompanying drawings, Fig. 1 shows one embodiment of the finished bridgework secured in place in the mouth. As shown, 25 is a natural tooth serving as an anchor, and 26 is another natural tooth serving as the other anchor for the dummy tooth or pontic 27. The said dummy tooth may take many forms, or might simply be a spacing device, but as embodied it comprises the porcelain body portion 28 seated and secured in the metallic cup part 29. An inlay 30 has been provided for the anchor tooth 25 at the top thereof and cemented thereto as indicated at 31, and a fixed connection is provided between the dummy tooth 27 and anchor tooth 25 by soldering the inlay 30 and metallic cup 29, as indicated by broken lines at 32.

The movable or pivoting connection of the dummy tooth with respect to the other adjoining tooth comprises an inlay 33 suitably cemented in place at the top of tooth 26. The inlay 33 has cast therein in its side facing the dummy tooth 27, the metallic plate portion or half-door element 34 which in this embodiment of the invention takes the form of a box-like member having an open top, open bottom, and half open front, said member being shown in detail in Fig. 4. The box-like member 34, when positioned in the inlay 33 as shown in Fig. 1, provides a space or receptacle to receive the enlarged head 35 of the pivot pin 36, which is firmly secured to, as by casting into, the metallic cup 29 of the dummy tooth 27. The assembly of the pivotal connection is completed by sliding the separate plate element or door element 37 downwardly into the box-like element 34, and the front surface 38 of said door element, and the front surface 39 of the box-like element, are provided with arcuate indentations in their meeting edges, as indicated by the numeral 40, to closely surround the pivot pin shaft 36. The door element 37 is securely soldered along its edges to the adjoining portions of the box-like member 34, where indicated by numeral 41 in Fig. 3, so that a secure and permanent connection is established between the dummy tooth 27 and the anchor tooth 26. The attachment is, however, capable of limited movement, for the indentations 40 are arranged to leave some looseness about pivot pin 36, so that the dummy tooth is capable of a limited movement.

The box-like element 34 and the closure 37 therefor may be conveniently and economically formed from blanks of sheet metal. The blank may be folded to form the sides 42 and the abutting panels 43 at the back of the member to form the back surface. The sides 44 of closure 37 are integrally formed with the rest of the member spaced apart to snugly fit between the sides 42 of box-like member 34. As shown in Fig. 6, the top or cusp surface of closure 37 may be formed of turned extents 45 and 46 of a blank sheet of metal, whereby a double thickness of material is provided at the top. The top edges of sides 44 are cut down to accommodate the double thickness of material, and such added thickness at the top of the closure element is desirable so that the element may be ground to conform to the surrounding surface of the inlay 33, as clearly shown in Fig. 3. The door element 37 may be provided with a recess 48 at the back which may be engaged by the technician with a suitable tool to raise and lower the element in the box-like member 34 when fitting the assembly together. The box-like element 34 is provided with an indentation 66 and the inlay 33 with a relieved place registering therewith when the box-like element is in place in the inlay, allowing free access of the tool to recess 48. These places are filled with solder when the bridge is finally completed and the line of soldering 41 is applied, as has been mentioned.

Figs. 8, 9, 10 and 11 disclose a modified embodiment of the half-door elements, providing the plate portion and separate plate element, wherein the lower such element comprises a front surface 49 and upwardly extending sides 50, which are turned providing channels 51, the entire element being cast into the inlay 33' which is provided with a recess 52 to receive the head of 35 of the pivot pin 36. The other half-door element is shown in detail in Figs. 9, 10 and 11, comprising a front surface 53, having side wings or extensions backwardly displaced therefrom to be positioned in channels 51 in assembling the bridgework. A double thickness top portion 55 is also provided in this embodiment of the invention, and such portion is formed to accurately fit the upper end of recess 52, and is soldered to the surrounding surfaces of inlay 33' when the members are finally assembled. The half-door element 53 is provided with a recess 67, and the inlay 33' with a relieved place 68, to receive a dentist's tool as already described, and both are filled when the half-door element is finally soldered in place.

The inlay construction which has been described is simple and inexpensive in construction and much easier to fabricate and install than other designs, and at the same time provides the desired type of attachment for fixed bridgework comprising a rigid connection with one anchor tooth, and a movable but restricted connection with the other anchor tooth. Although the inlay 33 for the anchor tooth 26 is shown as arranged substantially vertically, it will be apparent that it may be positioned at various angles with respect to its tooth as may be required by varying conditions, the pivotal attachment to the dummy tooth allowing considerable latitude in manipulation of the bridgework when installing it in the patient's teeth.

The steps of preparing and installing the bridgework of the invention will now be discussed. The anchor teeth 25 and 26 (Fig. 1) to either side of the space to be occupied by the bridgework are first prepared by the dentist for inlays, full crowns, three quarter crowns, or other metal restoration work needed to support a bridge. In the accompanying drawings such work is illustratively shown as inlays 30 and 33. The posterior tooth usually serves as the anchor for the rigid connection, while the anterior tooth serves for the movable connection, although this may be reversed depending upon circumstances encountered, such as, for instance, the angularity of the teeth in the mouth. The dentist then makes an individual impression of each anchor tooth and the cavity which has been prepared in it, for use of the technician in making a die upon which a wax model of the inlay is made, and then the inlay itself (or other restoration).

A dental laboratory technician next prepares wax pattern inlays from the impressions received from the dentist, and each pattern is formed and carved so as to restore cusp and other external surfaces desired. It is now desired to cast the inlays, and the inlay for the fixed anchor tooth (inlay 30, Fig. 1) is cast in any usual and conventional manner. However, the inlay for the pivotal anchor is to be cast with one of the half-door elements in it, and for this purpose, using the form shown in Figs. 1 to 6 as an example, the wax pattern is prepared with the box-like element 34 in it in the desired position. A rectangular carbon bar is prepared to fill the element 34 and project upwardly above it, so that the projecting portion extends into the investment compound in the conventional type casting device, preventing cast metal from filling the box-like element. The casting of the inlay 33 then proceeds in the usual way, first burning out the wax pattern, casting the metal, and breaking away the investment compound. The carbon bar is removed at this time from the cast inlay.

The finished inlays are then given to the dentist, and the inlays are finally fitted in the anchor teeth. After a proper fit has been assured, a plaster impression of the entire area, both upper and lower, is made, and also a wax bite, and models are made from the area impressions and mounted on an articulator. The models permit installation and removal of the inlays in their cavities as the work proceeds. The models, inlays and wax bite are then turned over to the laboratory technician.

The dummy tooth or pontic 27 is now to be prepared and assembled in the proper position in the bridge, and in the illustrative form shown in the drawings the dummy tooth comprises the porcelain top 28 cemented in metal cup 29. The cup 29 is first provided in wax with the porcelain top 28 positioned in it and the dummy tooth in this form is fitted between the anchor teeth on the articulated models, with the metal inlays 30 and 33 in place therein. With the upper half-door element 37 removed (which is facilitated by the recess 48 as has been described) the technician extends a prick tool down through the box-like element 34 in the inlay 33 and makes a mark on the dummy wax cup where the pivot pin 36 is to be positioned, using the visible, arcuate indentation 40 in the element 34 as his guide. The dummy tooth is then removed from the model, the porcelain top 28 removed, and the pivot pin is pushed into the wax cup at the marked spot. A check may now be made of the parts by putting the wax cup in place on the model, with the pivot pin head in the box-like element 34 and the upper half-door element 37 in place, to assure that the dummy tooth contacts pivot tooth 26, fits the bite correctly, contacts the fixed anchor tooth 25 for the later soldering, and that the half-door element 37 fully seats. Assembly and disassembly may be repeated until proper fit and cooperation of all elements are assured.

The wax cup is then removed from the model, and the cup with the pivot pin 36 positioned therein is put in the mold casing and the casting made in a usual and conventional manner. The dummy tooth cup 29 has now been prepared with the pivot pin 36 cast into it, and all of the parts may now be reassembled on the model. The cup is soldered to inlay 30 at 32, the slide door-half 37 is put in position and its occlusal surface crevises are soldered, and the porcelain cap 28 may be cemented into the cup, although this may be done by the dentist at the time the bridge is fixed in the mouth of the patient. The pin 36 will ordinarily have been pushed completely through the wax cup for the dummy tooth, and after casting with the cup 29 whatever of the shank of the pin extends into the cup may be trimmed off, and the end of the pin soldered to the cup at the interior surface of the cup.

The bridgework now constitutes a finished, assembled unit (Fig. 7) comprising the inlays 30, 33, connected to dummy tooth 27, and the unit is returned to the dentist for cementing in the patient's mouth, as shown in Fig. 1.

The universal joint connection of inlay 33 with dummy tooth 27 by means of pivot pin 36 permits considerable manipulation when installing in the mouth, and there is no need for parallelism in the cavity surfaces in the anchor teeth. Drifting of the anchor teeth away from each other is prevented by the head 35 of the pivot pin which engages the inner surface of the box-like construction 34—37.

The invention in its broader aspects is not limited to the specific mechanisms, process, steps, combinations and embodiments shown and described but departures may be made therefrom, within the scope of the accompanying claims, without departing from the principles of the invention and without sacrificing its chief advantages.

What I claim is:

1. In dental bridgework having a dummy member to be movably connected to an adjoining natural tooth member, in combination, a pin, having an enlarged head, permanently secured to one of said members and extending toward the other member, a restoration piece to be secured in a cavity in the other said member, said restoration piece having a recess therein to receive the enlarged head of said pin, said restoration piece having a plate portion at one side thereof partially closing said recess at the lower part thereof, and a separate plate element engageable with said plate portion and formed to complete closure of said recess in said restoration piece whereby said enlarged head is retained in said recess, said plate element having an upper portion turned with respect thereto forming a continuation of the upper surface of said restoration piece.

2. In a dental bridgework having a dummy member to be movably connected to an adjoining natural tooth, in combination, a pin, having an enlarged head, permanently secured to said dummy member and extending toward said natural tooth, a restoration piece to be permanently secured in a cavity in said natural tooth, said restoration piece having a recess therein to freely receive the enlarged head of said pin, a plate portion secured in said restoration piece at one side thereof partially closing said recess at the lower part thereof, and a plate element engageable with said plate portion and formed to complete closure of said recess in said restoration piece whereby said enlarged head is retained in said recess.

3. Dental bridgework as set forth in claim 1 wherein said plate portion is the front surface of a box-like member cast into said restoration piece the interior whereof forms the recess in said piece and the plate element forms a closure for said box-like member having sides to slideably engage within said box-like member, a front to abut and form a continuation of said front surface of said box-like member, and a top, said top providing a surface in continuation of the upper surface of said restoration piece.

4. Dental bridgework as set forth in claim 1 wherein said plate portion is formed with longitudinally extending grooves therein and said plate element is formed with wing portions displaced from the front surface thereof to slideably engage in said grooves.

References Cited in the file of this patent

UNITED STATES PATENTS

| | | |
|---|---|---|
| 220,506 | Studley | Oct. 14, 1879 |
| 558,262 | Darling | Apr. 14, 1896 |
| 1,474,370 | Kiander | Nov. 20, 1923 |
| 1,519,505 | Noyes | Dec. 16, 1924 |
| 1,641,626 | Eisenstein | Sept. 6, 1927 |
| 1,748,412 | Crawford | Feb. 25, 1930 |
| 1,761,312 | Richardson | June 3, 1930 |
| 2,129,861 | Morton | Sept. 13, 1938 |
| 2,227,735 | Morton | Jan. 7, 1941 |
| 2,314,094 | Lasky | Mar. 16, 1943 |
| 2,362,875 | Zahn | Nov. 14, 1944 |
| 2,375,486 | Morin | May 8, 1945 |
| 2,549,528 | Russell | Apr. 17, 1951 |
| 2,563,976 | Torosian | Aug. 14, 1951 |